J. F. G. ROBERTS.
COOKING APPARATUS.
APPLICATION FILED JUNE 26, 1917.
1,248,428.
Patented Nov. 27, 1917.
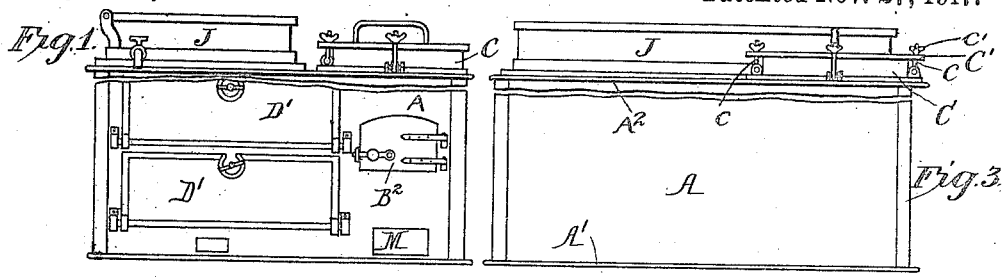
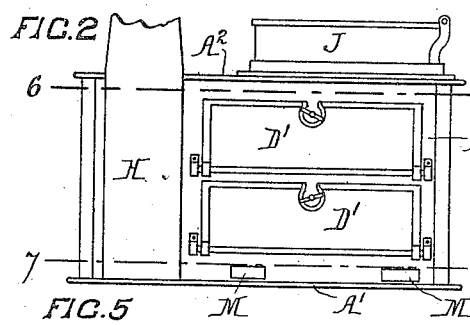
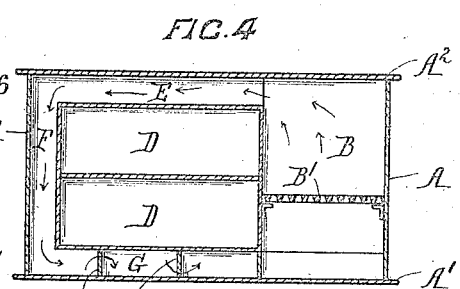
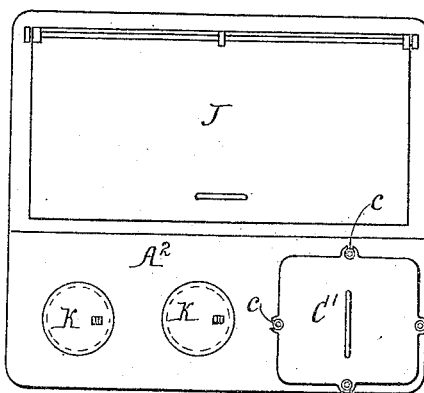
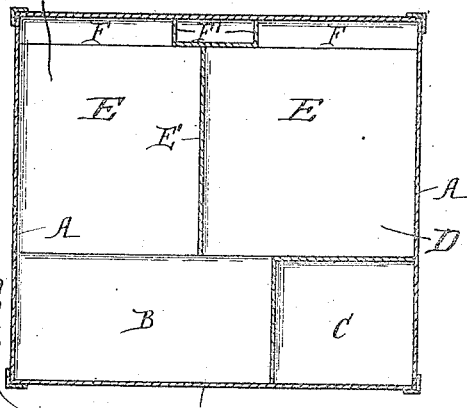
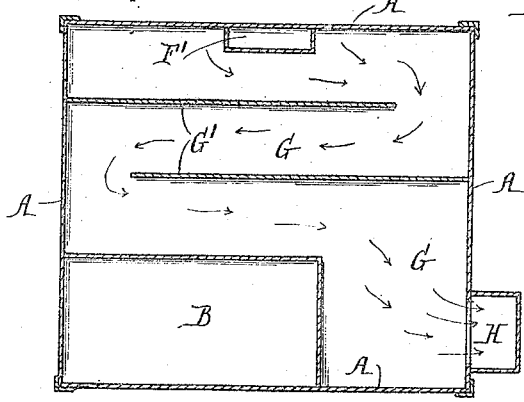
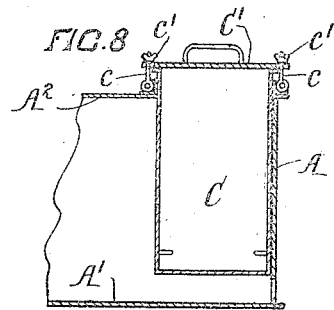
Inventor, James Ferdinand Groom Roberts
By B. Singer, Attorney.

UNITED STATES PATENT OFFICE.

JAMES FERDINAND GROOM ROBERTS, OF WELLINGTON, NEW ZEALAND.

COOKING APPARATUS.

1,248,428.  Specification of Letters Patent.  Patented Nov. 27, 1917.

Application filed June 26, 1917. Serial No. 177,136.

*To all whom it may concern:*

Be it known that I, JAMES FERDINAND GROOM ROBERTS, subject of the King of Great Britain, residing at 15 Holland street, Wellington, New Zealand, have invented a new and useful Improvement in Cooking Apparatus; and I do hereby declare the following to be a full, clear, and exact description of the same.

This invention relates to an improved construction of that class of apparatus designed for the cooking of foods in large quantities and especially for military, restaurant and public institution purposes and consisting generally in a number of cooking chambers or ovens and an arrangement of flues whereby the heat from a fire may be distributed through such chambers or ovens.

The present invention consists in improvements in the general construction and arrangement of the chambers ovens and flues in a casing that may be either stationary or may be mounted on a carriage for transporting purposes so as to be adapted for moving military and other bodies. By this special arrangement and construction a more effective distribution of the heat and a more convenient and compact grouping of the chambers and ovens, are obtained.

The invention is illustrated in the accompanying drawings, in which:—

Figure 1 is a front end elevation of the apparatus.

Fig. 2 is a back end elevation thereof.

Fig. 3 is a side elevation.

Fig. 4 is a cross sectional elevation taken through the oven chambers.

Fig. 5 is a plan of the apparatus.

Fig. 6 a sectional plan taken on the line 6—6 of Fig. 2.

Fig. 7 a sectional plan taken on the line 7—7 of Fig. 2.

Fig. 8 a vertical section of a portion of the apparatus.

According hereto the apparatus is formed with a casing A of suitable material and size, and if required with insulated walls. The casing rests upon a suitable bottom plate A' and is covered by a top plate A². The space inclosed by the casing is divided into three main divisions, such divisions consisting in a furnace B situated in one front corner, a cooking chamber C at the rear end of the casing behind the furnace, and an oven division extending from front to back alongside the other two divisions. These several divisions are suitably divided from one another by means of plates extending vertically in the casing, these plates being secured to the casing in a manner well known in the art.

The furnace space B is provided with a grate B' and an ashpit below the grate, the necessary fire door B² being provided in the casing front to allow of access to the fire.

The oven division is divided into a number of ovens D extending inward respectively from the front and back ends of the casing and arranged one above the other. Four of these ovens are shown in the drawings, two opening from the front and two from the back of the casing each pair being arranged one above the other as shown. The ovens thus extend back to back and each one is furnished with a door D' of suitable design to permit of access to the space inclosed thereby.

The block of ovens thus extend on one side along the side of the fire space B. The block is so arranged within the casing as to leave a space E between its top and the top of the casing, a space F between its other side and the outside of the casing, and a space G between its bottom and the bottom of the casing.

Consequently there is a continuous passage from the furnace B along above the tops of the ovens, down the outside thereof and along beneath them.

The space E above the ovens is divided by means of a baffle plate E' into two transverse divisions while the space F is also divided into two by the vertical baffle F' extending medially down it. The space G beneath the ovens is divided longitudinally by a number of baffles G' so disposed that a zigzag course is provided to and fro in such space and finally to an outlet at its back end leading into a flue H. This construction assures that the heat from the furnace will pass over the tops of the ovens and down the outsides thereof, being equally distributed over both sets by the baffles E' and F', and will then pass to and fro beneath them a number of times, before passing to the flue H. The ovens will therefore be effectually heated.

The cooking chamber C at the back corner of the casing has the space G extending beneath it and the flue opening leading out therefrom as shown in Fig. 8. Consequently this chamber will be heated by the furnace and also the heat therefrom after it has passed around the ovens. It is so formed as to be adapted to receive cooking vessels and is furnished with a cover C' that is secured thereon by means of the hinged bolts c and wing nuts c', or by any other approved means.

A hot water tank J may be arranged to extend along one side of the top of the casing such tank being furnished with the usual draw off taps and steam vents.

The top plate of the casing above the furnace is formed with pot openings and covers K so that cooking vessels may be placed thereon and heated as with ordinary stoves or ranges.

The casing ends are provided with soot openings and doors M arranged correspondingly with the ash pit and flues so that the stove may be cleaned as required. A stove thus constructed is adapted either for stationary or transport purposes and may be mounted on a carriage of suitable design when used as the latter.

I claim:—

1. A cooking apparatus comprising in combination a casing, a furnace extending in one side thereof to the bottom of the casing; oven chambers extending from front to back alongside said furnace; said casing being spaced from said chambers at the top, at the side opposite said furnace, and at the bottom; said spaces at the top, side and bottom of the casing extending the full depth of the casing from front to back and being in communication with said furnace; a vertical flue opening directly into said space at the bottom of the casing on the same side as said furnace, and a cooking chamber opening at the top directly between the furnace and the vertical flue, said chamber extending downward to the bottom space.

2. A cooking apparatus comprising in combination a casing, a furnace extending in one side thereof to the bottom of the casing; oven chambers extending from front to back alongside said furnace; said casing being spaced from said chambers at the top, at the side opposite said furnace, and at the bottom; said spaces at the top, side and bottom of the casing extending the full depth of the casing from front to back and being in communication with said furnace; a vertical flue opening directly into said space at the bottom of the casing on the same side as said furnace, said vertical flue opening from said bottom space in the rear of said furnace; a baffle in said top space dividing the same into two approximately equal passages; a vertical baffle in said side space opposite said furnace forming two passages in said side space which are continuations of the passages in said top space; and baffles in said bottom space running parallel to said furnace and forming a single continuous tortuous passage beneath the ovens, and a cooking chamber opening at the top directly between the furnace and the vertical flue, said chamber extending downward to the bottom space immediately in the rear of said furnace, said cooking chamber also being above said bottom space and said flue opening immediately in the rear of said cooking chamber.

In testimony whereof, I have signed this specification in the presence of two subscribing witnesses.

JAMES FERDINAND GROOM ROBERTS.

Witnesses:
W. ALEXANDER,
M. E. BROWN.

Copies of this patent may be obtained for five cents each, by addressing the "Commissioner of Patents, Washington, D. C."